May 15, 1962  W. T. ANDERSON  3,034,378
METHOD OF MAKING CARBIDE TIPPED SAW BLADE AND OTHER TOOLS
Filed May 18, 1961  4 Sheets-Sheet 1
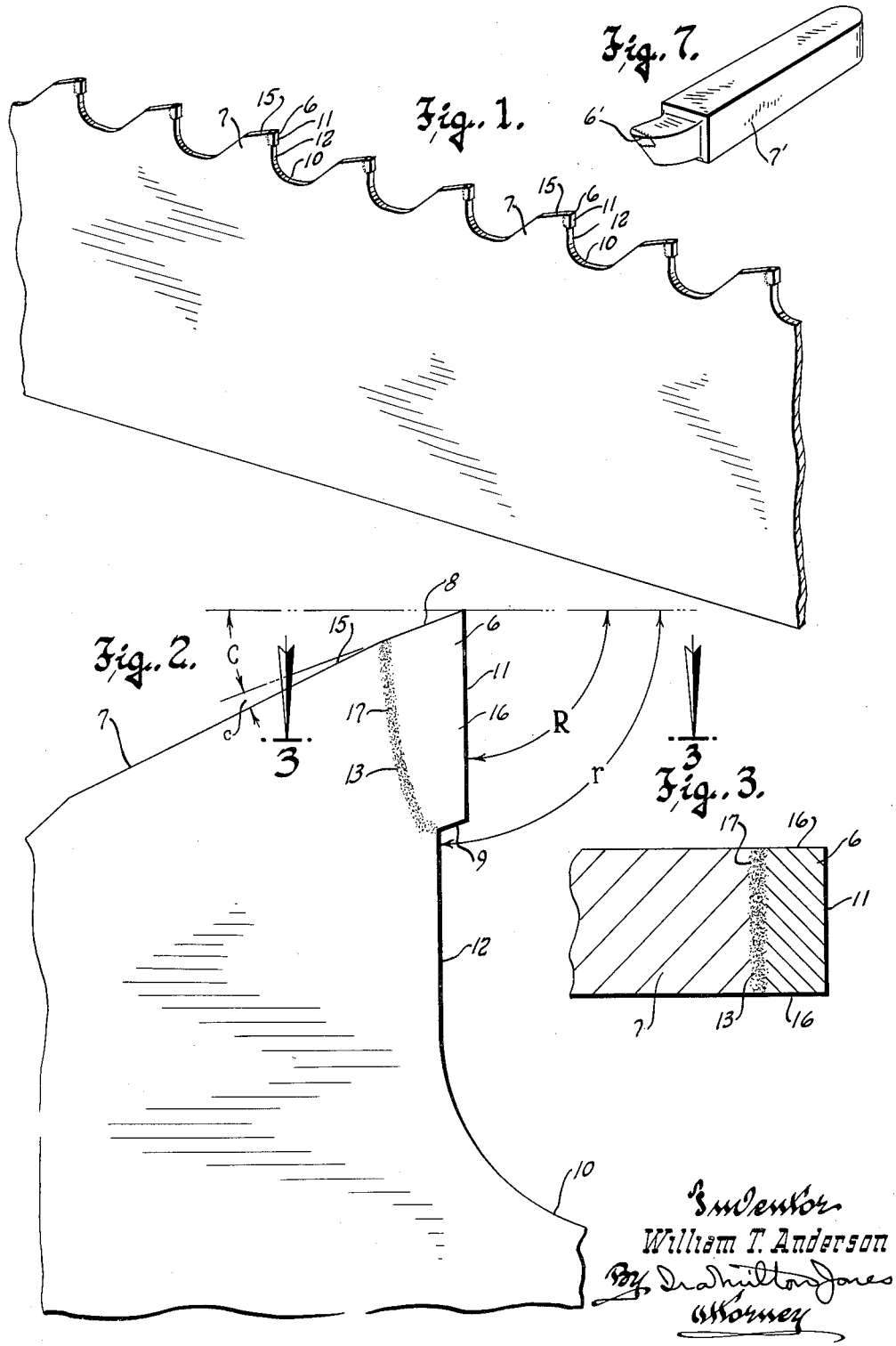
Inventor
William T. Anderson
By Ira Milton Jones
Attorney May 15, 1962 W. T. ANDERSON 3,034,378
METHOD OF MAKING CARBIDE TIPPED SAW BLADE AND OTHER TOOLS
Filed May 18, 1961 4 Sheets-Sheet 2

Inventor
William T. Anderson
By Ira Milton Jones
Attorney

May 15, 1962 W. T. ANDERSON 3,034,378
METHOD OF MAKING CARBIDE TIPPED SAW BLADE AND OTHER TOOLS
Filed May 18, 1961 4 Sheets-Sheet 3

Inventor
William T. Anderson
By
Attorney

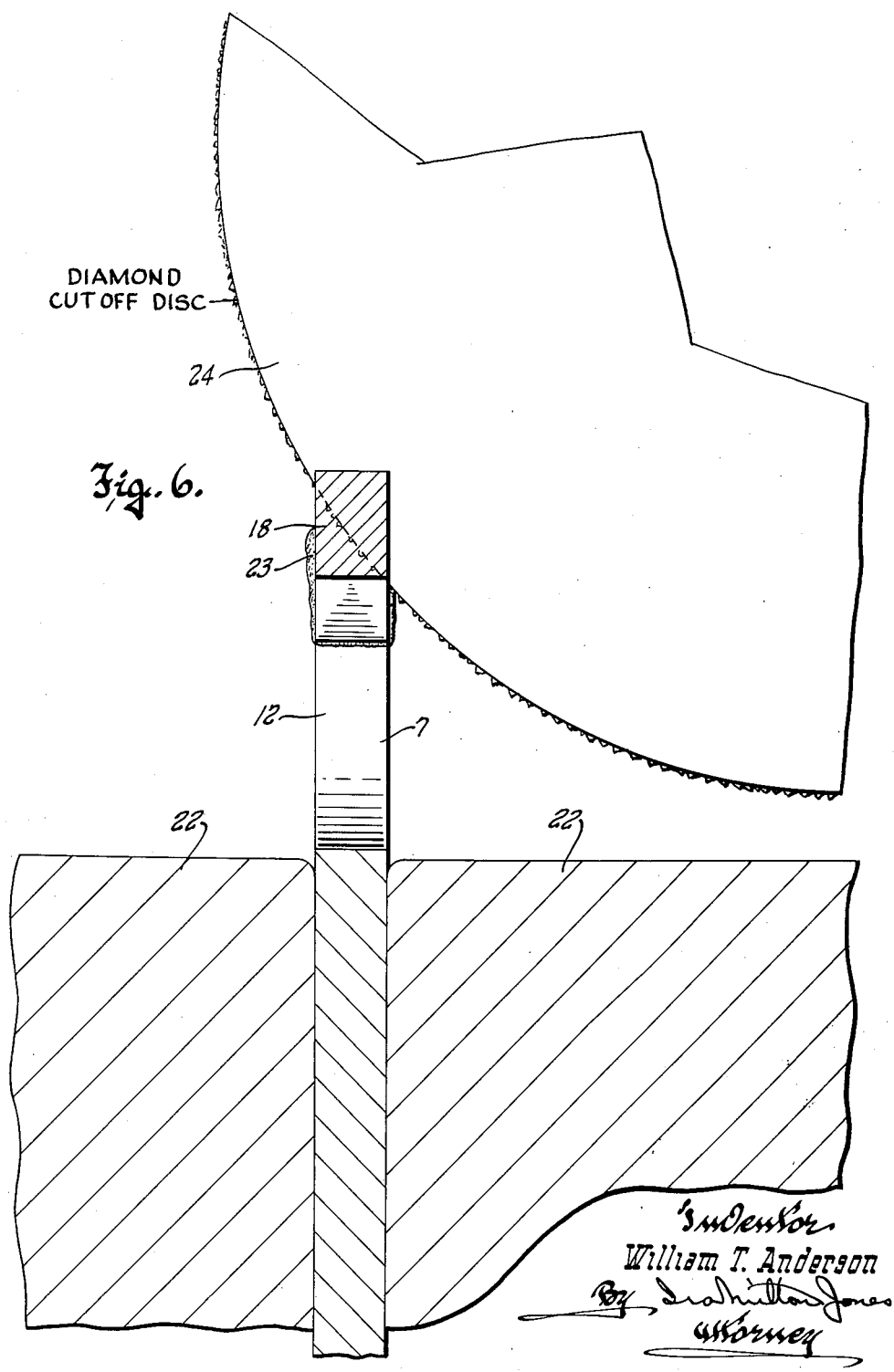

United States Patent Office 3,034,378
Patented May 15, 1962

3,034,378
METHOD OF MAKING CARBIDE TIPPED SAW BLADE AND OTHER TOOLS
William T. Anderson, Vernon Township, Lake County, Ill., assignor to The Do All Company, Des Plaines, Ill., a corporation of Illinois
Filed May 18, 1961, Ser. No. 110,989
19 Claims. (Cl. 76—112)

This invention relates broadly to cutting tools, and refers more particularly to metal cutting band saws or blades, the making of which poses problems not encountered in the manufacture of other types of saws and metal cutting tools.

The advantages of a saw band or blade having extremely hard cutting teeth and a tough, fatigue resistant back or body, have been known and understood for many years. Quite early in the art a compound or laminated steel strip consisting of a narrow band of very hard steel welded to one edge of a wide band of softer steel was employed for this purpose, the teeth obviously being in the hard steel band. The Blum Patent No. 1,521,857, is an example of this way of making saw blades.

Another approach to the problem was through selective heat treatment and tempering of the saw band or blade, i.e. giving the teeth a heat treatment different from that of the rest of the band. This expedient forms the basis of the Whitaker Patent No. 1,130,649, and the Napier Patent No. 1,352,140.

A third approach to the problem consisted in brazing or similarly fastening hard steel or carbide inserts or tips in or to the teeth. Examples of this method of making saw blades or bands will be found in the Wilkie Patent No. 2,318,549, and the Kolesh Patent No. 2,880,768.

Obviously, of course, the success of a saw band or blade having hard steel or carbide inserts or tips fastened in or to the teeth, depends upon the security of the fastening and the support given the cutting tips or points by the body of the teeth. The patentee Kolesh recognized this, and in an attempt to meet these requirements, swaged the front or leading face of the teeth to provide seats of increased area to support the hard metal or carbide tips which were brazed or similarly anchored thereto. But this still left the serious objection of having to braze or similarly secure the hard steel or carbide to the teeth, and—as will be shown—the objection resides not only in the difficulty of handling the small carbide tips, but more seriously, in the very nature of the bond.

Brazing materials customarily used are non-ferrous, brass being the most common. Hence, they have the disadvantage that, as a result of the "work hardening" that occurs in use, such materials may become brittle, especially where the area of the bond is small in relation to the effective cutting edge of the tool, as is the case in a saw blade. Also, the temperatures reached by the carbide tips during the cutting operation often can exceed the melting point of the brazing material. Obviously, therefore, any method which entails brazing the carbide tips to the teeth, really leaves the problem unsolved.

This invention has as its purpose and object the provision of a new and improved method of making a saw band or blade having carbide cutting tips or points secured to the saw teeth, and also other cutting tools which are desirably equipped with small carbide cutting tips, as for instance, cutter blades for lathes, shapers and the like.

Although a full and complete description of the invention no doubt could be made without the aid of drawings, the accompanying drawings will make it easier to understand the invention. In these drawings:

FIGURE 1 is a perspective view of a length of saw band or blade made by the method of this invention;

FIGURE 2 is a side view of one tooth of the band at a greatly enlarged scale, showing the same in its finished condition;

FIGURE 3 is a cross sectional view through FIGURE 2 on the plane of the line 3—3;

FIGURE 6 is a cross sectional view through FIGURE 5 on the plane of the line 6—6, and illustrating the next successive step in the method of providing the saw tooth with a carbide cutting tip or point; and FIGURE 7 is a perspective view of a cutter for use in a lathe or other machine tool, made in accordance with this invention.

Figure 4:
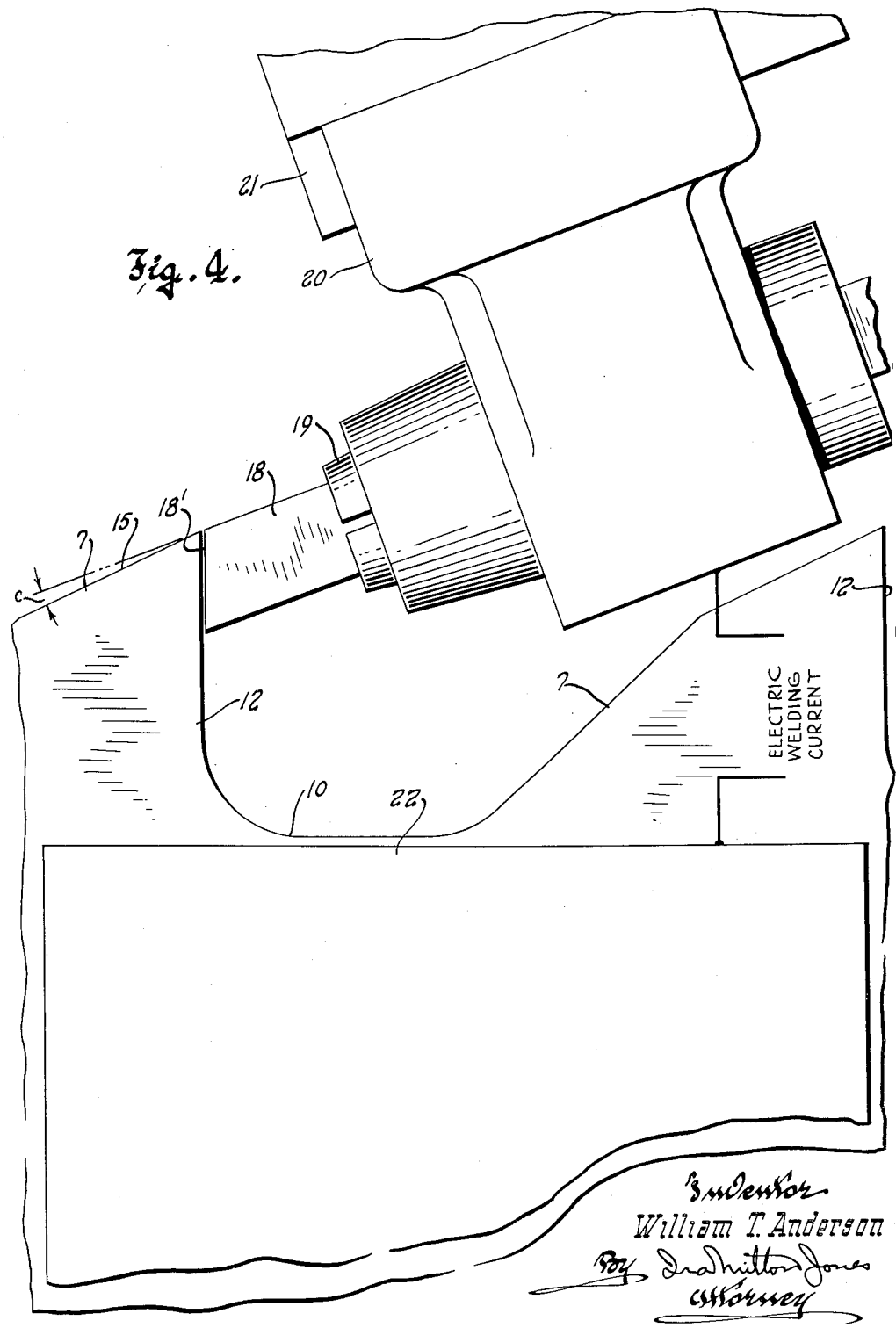
FIGURES 4 and 5 are side views of one of the teeth of the saw band or blade and together illustrate how, through the practice of this invention, the carbide tip which is to form the cutting point of the tooth, is secured thereto.

As best shown in FIGURES 2 and 3, the individual saw teeth produced by the practice of this invention have certain distinguishing characteristics, even apart from the specific junction between the teeth and their carbide cutting tips or points. The carbide tip 6 is quite small in comparison to the tooth 7. Its total length from its outer end 8 to its inner end 9 seldom exceeds one-third the total height of the tooth, and generally is less. The tooth height, of course, is the distance from the bottom of its gullet 10 to its outer extremity.

The front face 11 of the carbide tip is flat and may be parallel to the front or leading edge 12 of the tooth, as shown, though this not essential. Thus, the rake angle of both the front edge 12 of the tooth and the front face 11 of the carbide tip may be 0°, which, of course, is 90° to the direction of band travel, as shown by the angles "r" and "R" in FIGURE 2. Or, if desired, the rake angle of the front face 11 of the carbide tip could be something between 0° and 10°, either positive or negative. For sharpening purposes it is preferable, however, to have the front face of the carbide tip protrude beyond the front edge of the tooth. The thickness of the carbide tip, as measured from its front face 11 back to its rear 13, is greater at its outer end than at its inner end 9, but even at its inner end, it is set into the tooth so that the tip is solidly supported.

Still another distinguishing characteristic of this invention is that both sides 16 of the carbide tip are flush with the sides of the tooth and that the top clearance angle (C in FIGURE 2) of the carbide tip is slightly less than that of the adjacent portion of the trailing edge 15 of the tooth. This latter feature facilitates grinding of the top or outer end of the carbide tip for sharpening or dressing purposes, since it enables the tip to be ground without having the diamond grinding wheel come in contact with the steel of the tooth.

The primary distinguishing characteristic of the saw tooth produced by the method of this invention, however, lies in the junction between the carbide tip and the tooth. This junction which the drawing depicts by the stippled zone 17, extends across the portion of the inner end 9 of the carbide tip which is set into the tooth, and along the rear 13 of the tip. It consists exclusively of the carbide of which the tip is formed and the steel of the tooth, and is formed by fusing the carbide tip to the steel by means of the electric-welding technique.

In its finished form, the carbide tipped saw tooth produced in accordance with this invention and as described above, is like that of my aforesaid copending application, but the method by which it is produced is quite different from that described in said application. By virtue of this difference, the amount of carbide wasted is reduced to a minimum, and all the difficulties attending the handling of small bits or slugs of carbide are eliminated.

Very briefly stated, the key to the success of this invention resides in the fact that the carbide is in the form of a rod at the time it is secured to the tooth. This rod may be two feet (2′) long, or even longer, and is preferably of rectangular cross section, with one dimension thereof substantially equal to or slightly greater than the thickness of the saw blade or band and its other dimension somewhat larger. Thus, for instance, if the band has a thickness of thirty-two thousandths of an inch, the small cross sectional dimension of the carbide rod should be at least thirty-two thousandths of an inch, and the longer dimension—which determines the length of the carbide tip—preferably should be in the neighborhood of forty-thousandths of an inch.

As in the aforesaid pending application, the carbide is electric-welded to the steel tooth, but because the carbide is in the form of an elongated rod at the time it is welded to the tooth, the welding operation is not only greatly simplified, but may be carried out automatically.

Figure 5:
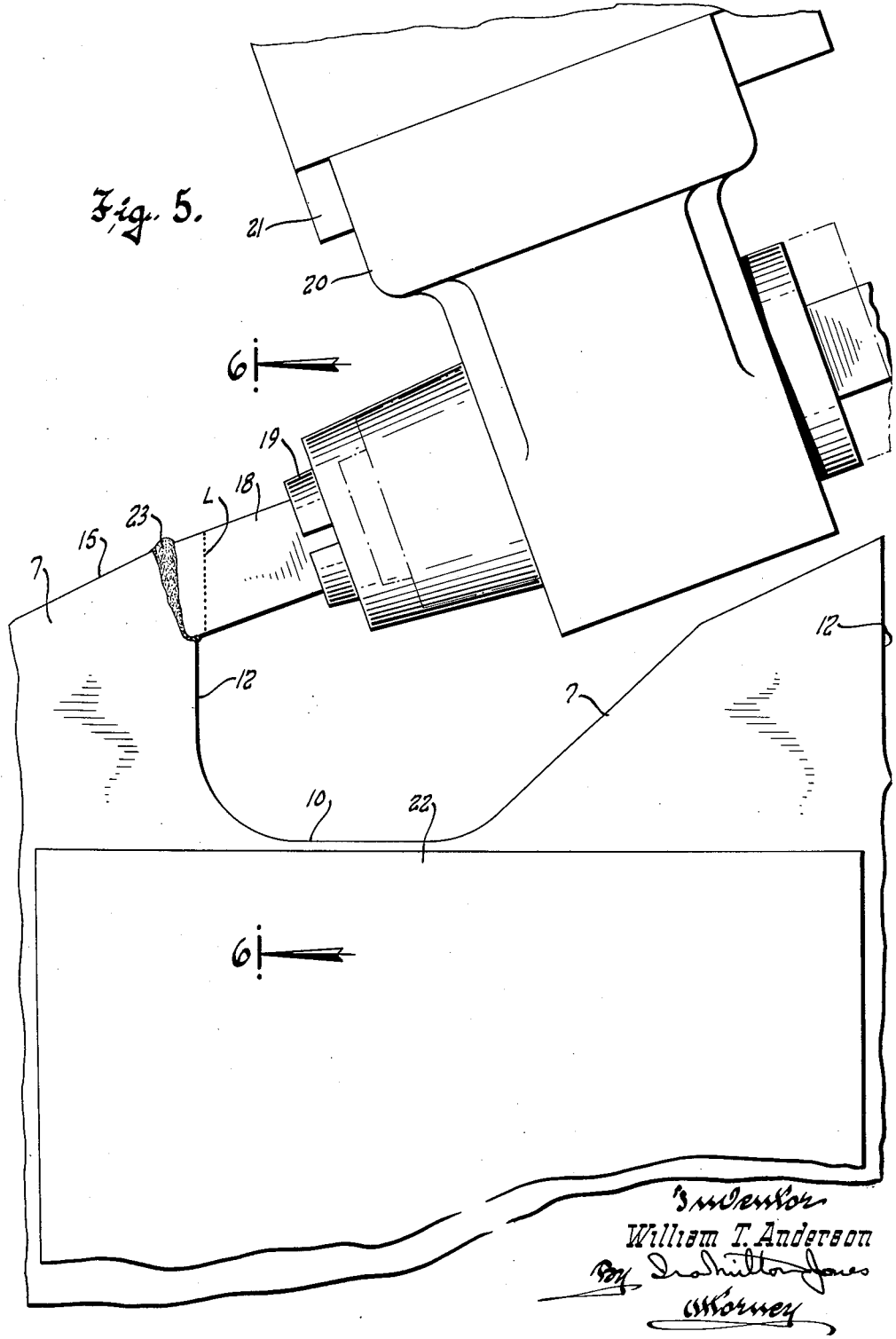

The way in which it is done is depicted in FIGURES 4 and 5. As here shown, the carbide rod, designated by the numeral 18, is gripped in a holder 19 which has a collet-like construction that permits relative motion between the rod and the holder in one direction lengthwise of the rod, but precludes it in the opposite direction. This collet-like holder 19 is, in turn, mounted on or carried by a slide 20 which rides on a stationary track 21 parallel to the rod.

The collet-like holder 19 is adapted to be moved axially back and forth a slight distance with respect to the slide 20 by which it is carried, and in its forward stroke—i.e. to the left in FIGURES 4 and 5, it carries the carbide rod 18 with it. During retrograde motion of the holder 19, the rod 18 does not move with it, providing, of course, that the rod is held against such movement. This enables the rod 18 to be advanced stepwise with respect to its holder 19, and also allows the rod to be advanced by forward movement of the holder 19 with respect to the slide 20.

When the rod 18 is not held by means other than the holder 19, it can, of course, be advanced or retracted along with the holder by motion of the slide 20 along its track 21. Thus with the structure more or less diagrammatically illustrated in FIGURES 4 and 5, it is possible to bring the end 18′ of the rod into engagement with the front edge 12 of a tooth 7 in position to have a carbide tip applied thereto.

To assure proper alignment between the carbide rod and the tooth, the toothed saw band or blade is gripped in a holder 22 which may be vise-like with complementary clamping jaws between which the saw blade or band is held, and which, upon being separated, permit the band to be advanced stepwise, by some suitable indexing mechanism, to successively bring its teeth into position to have the end 18′ of the carbide rod welded thereto.

To effect the welding of the carbide rod to each tooth as it is presented thereto, the holders 19 and 22, which respectively grip the carbide rod and the saw blade or band, are suitably connected to the opposite terminals of a source of welding current, the connection being diagrammatically depicted in FIGURE 4.

The apparatus by which the method is carried into effect, of course, incorporates mechanism by which the various operations are effected in proper timed sequence, so that all of the successive teeth on the saw band or blade may have carbide tips applied thereto, automatically and in rapid succession.

As each tooth 7 comes to rest at the tip-applying station and is gripped by the holder 22, the slide 20 is advanced along its track 21 to bring the end 18′ of the carbide rod against the outer end portion of the front edge 12 of the tooth. Because of the relationship of the holders 19 and 22, the carbide rod is held with its opposite side faces coplanar with the sides of the tooth, or at least parallel thereto if the rod is slightly thicker than the band, and with the top edge of the rod flush with or slightly above the corner of the tooth formed by the junction of its front face 12 and the portion 15 of its trailing edge. In order that the outer end 8 of the finished carbide tip will be disposed at an obtuse angle to the edge portion 15, as hereinbefore described and as shown in FIGURES 2 and 4, the path along which the rod 18 is fed to the tooth forms an extreme obtuse angle to the top edge 15, as indicated at "c" in FIGURE 4.

With the holders 19 and 22 properly adjusted relative to one another to assure the desired presentation of the carbide rod 18 to the tooth—and it should be understood that in practice the holders would be relatively adjustable—the apparatus and the source of welding current are activated to successively effect:

(1) Advance of the carbide rod into contact with a steel tooth;
(2) Heating of the portion of the tooth which is contiguous to the carbide rod to its fusion temperature, and the immediately adjacent portion to its plastic deformation or forging temperature;
(3) Advance of the rod under predetermined force to drive the end of the rod through the portion of the steel which is at fusion temperature and solidly against the adjacent portion of the steel which is only at its plastic deformation or forging temperature; and
(4) Annealing of the junction to release stresses in the steel.

These successive operations take place so rapidly that the carbide tips may be applied at a rate of more than three per minute.

The advance of the carbide rod to bring the same into contact with the tooth, and also to drive the same into the tooth after the flow of welding current across the junction has brought the contiguous portion of the steel tooth to the proper temperature, is of course produced by the action of the slide 20; and the annealing of the steel tooth—or, more correctly, the portion thereof contiguous to the fused junction between the carbide rod and the tooth—is effected by an appropriate adjustment of the welding current. Hence, heating, welding and annealing all follow one another without interruption, to the end that the carbide rod is securely fused to the steel tooth and a layer or zone of stress-free steel of about 58 R.C. underlies the fused junction.

At the start of the operation, the end 18′ of the carbide rod was first cut off to be parallel with the front edge or face 12 of the tooth to assure that initial contact between the end of the carbide rod and the tooth, would be a surface-to-surface engagement. However, during the forced projection of the rod into the steel tooth, the end 18′ of the rod is deformed and the contiguous portion of the tooth is upset, as at 23. The rod penetrates into the tooth farther at its outer edge than at its inner edge, with the result that the interface or junction between the end of the carbide rod and the steel tooth is not parallel to the front edge 12 of the tooth but, on the contrary, is curved, as shown, and peculiarly the upset material 23 is greatest in volume at the outer end of the tooth.

Why the penetration of the carbide rod into the tooth is not uniform, or, in other words, why the end of the rod is deformed despite the fact that the temperature involved does not reach the melting point of the carbide, is not known. The answer may lie in a combination of factors such as variation of current due to the unequal angles existing in the leading end portion of the rod, i.e. obtuse at its outer edge and acute at its inner edge; temperature variation due to varying heat losses from the interface to the band back by conduction or to the atmosphere by radiation; and perhaps a minor dimensional deformation in the end portion of the rod as it is driven into the tooth.

The unusual pattern which the upset material 23 assumes as the weld is formed, likewise is not understood, but may be caused, in part at least, by a magnetic field that exists around the fusion zone, causing the flowing metal to locate itself as shown.

In any event, as the end 18' of the carbide rod is pushed into the steel tooth, it forms a socket for itself and, upon completion of the weld, the carbide rod is set into the leading edge portion of the tooth, as shown, and the contiguous portion of the tooth is upset or swaged outwardly, as indicated at 23 in FIGURES 5 and 6.

Between successive cycles, the rod is severed at the dotted line L in FIGURE 5, preferably by means of a diamond-edged cutoff wheel 24; but before the rod is cut, the holder 19 is retracted with respect to the rod to its dotted line position in FIGURE 5. The distance the holder is retracted is equal to the thickness of the carbide tip plus the width of the kerf made by the cutoff wheel, and since the thickness of the wheel determines the amount of carbide rod that is wasted, the wheel is as thin as practicable. The described retraction of the holder 19 with respect to the rod is possible because of the collet-like nature of the holder and the fact that the rod is at this time affixed to the tooth.

The cutoff wheel 24 is mounted in any suitable manner (not shown) for edgewise movement in a defined plane fixed with respect to the holder 22 in which the band is gripped from a retrated position towards and through the rod.

As depicted by the dotted line L, the rod is severed directly adjacent to but slightly outwardly of the front edge 12 of the tooth; and the cutoff wheel is so held with respect to the holder 22, that the cut made by the wheel is parallel to the front edge 12. Severing the rod in this manner has the dual advantage of leaving the front edge or face 11 of the carbide tip parallel with the front edge 12 of the tooth, and establishing parallelism between the new end face of the carbide rod and the front edge of the next tooth.

As soon as the carbide rod is severed by the diamond-edged cutoff wheel 24, the slide 20 and with it the holder 19 and the carbide rod is retracted so that the saw band or blade may be advanced or indexed to bring its next tooth to the tip-applying station, whereupon the aforesaid sequence of steps is repeated.

As noted hereinbefore, the relative positions of the holders 19 and 22 should be adjustable to enable varying the angle at which the carbide rod is fed to the successive teeth. What this angle of approach should be will vary with different tooth shapes and pitch and generally should be as flat as the available space—especially between teeth—will permit.

As already pointed out, the method of this invention enables the teeth of a saw band or blade to be equipped with carbide tips at a very rapid rate, and entirely automatically—but, most important, with a minimum waste of carbide, which, of course, is not cheap.

After all of the teeth of a saw band or blade have been thus equipped with carbide tips, the opposite faces or sides of the teeth are ground to remove the upset portions 23, and make the opposite faces of the carbide tips flush with the sides of the teeth. Also, if necessary, the tops of the tooth tips are ground off to assure that no part thereof will be unsupported by the steel tooth.

With the teeth thus dressed and properly shaped, they are set in the conventional manner and in any desired pattern, and then, finally, the entire band or blade with its carbide tooth tips or points may be given a heat treatment to relieve it of any internal stresses.

Certain of the advantages of this invention are, of course, obvious—as, for instance, the extremely low loss or waste of carbide, and the rapidity with which the teeth can be equipped with carbide tips or points. But the great improvement in the saw band, and its long life and capability of being resharpened, are advantages which only use of the band will demonstrate.

No doubt the saw band is better because the carbide tips or points of its teeth do not break off in use, but why this is so has not been established. It may be that the location of the cut with respect to the interface or junction between the carbide and steel has an important bearing upon the security of the fused junction. Inevitably—due to the rather wide difference in coefficients of expansion and contraction between the steel tooth and the carbide rod, great internal stress is set up in the fused junction as it cools. If this stress is not relieved or significantly reduced, an impact upon the carbide tip conceivably would result in failure of the weld.

It is not known how far these internal stresses extend into the carbide rod, but from all that can be learned, it appears that they penetrate several thousandths of an inch. Hence, if the carbide rod is cut off close enough to the interface or fused junction between the carbide rod and the steel tooth, it is believed that the making of the cut brings about a material reduction, if not full elimination, of these internal stresses.

Experience has shown that where the carbide insert has the thickness and height mentioned, i.e. thirty-two thousandths of an inch (.032") thick, and forty thousandths of an inch (.040") high, and if the rod is severed at a location such that the carbide tip remaining on the tooth has a maximum thickness—as measured from its front face back to the weld—not in excess of approximately fifteen thousandths (.015") of an inch, exceptionally good results are achieved.

The security of the fused junction which is produced by the method of this invention, to a degree may also be explained by the possible migration of steel into the interstices of the carbide during the formation of the weld, since carbide, though extremely hard, does not possess the density of its constituent elements, or of the steel of which the tooth is formed.

The steel used for the band or blade and, hence, of course, the teeth which are integral therewith, may be of any analysis which assures the desired resistance to fatigue failure, and the ability to withstand shock. Steel identified as S.A.E. 6150 has been found entirely suitable, and preferably it should have a hardness of 45–50 R.C.

In the preceding description of the invention the presence of teeth on the band was presupposed, since the manner in which they are formed is no part of this invention. Any conventional way of producing the teeth may be employed, but they must be formed or produced before the carbide can be welded thereto.

Preferably, the welding of the carbide rod to each tooth as it is presented thereto, is done in an inert atmosphere such as argon or helium, supplied to the welding zone in any conventional manner.

Although it is the primary purpose of this invention to provide a method of making an improved saw blade, it will be understood by those skilled in the art, that the invention may be used to advantage in conjunction with other cutting tools. For instance, the cutters customarily used in lathes, shapers, boring mills, etc., would be improved if they had carbide tips welded thereto in accordance with this invention, and in FIGURE 7 there is illustrated a cutter for use in a lathe or shaper having a carbide tip 6' fused or welded to a steel shank 7'. Obviously, of course, the carbide rod used to produce the tip 6' would be larger in cross section and of different shape than the rod 18, but essentially the procedure involved in forming the tip 6' would be the same as hereinbefore described.

Throughout the foregoing specification and also in the claims, the term "carbide" has been used as a generic term for tungsten carbide, with and without additives such as titanium carbide, boron carbide, tantalum carbide, cobalt, and any other similar alloy having extreme hardness and the structure and properties of tungsten carbide. Hence, in construing this specification and the appended claims, the term "carbide" should be given this generic meaning.

What is claimed as my invention is:

1. A method of providing a hard cutting edge for a

1. A method of providing a hard cutting edge for a tool formed of steel possessing the properties necessary to withstand shock, which comprises: electric welding an end of a rod of metal much harder than the steel of which the tool is formed, to the tool where the cutting edge is to be located; severing the rod close to the tool; and shaping the welded-on piece of hard metal into a cutting edge for the tool.

2. A method of providing a hard cutting edge for a tool formed of steel possessing the properties necessary to withstand shock, which comprises: electric welding an end of a tungsten carbide rod to the tool where the cutting edge is to be located; severing the rod close to the tool; and shaping the welded-on piece of tungsten carbide into a cutting edge for the tool.

3. A method of providing hard cutting points for the teeth of a saw formed of steel possessing the properties necessary to withstand shock and have good resistance to fatigue failure, which comprises: electric-welding an end of a rod of metal much harder than the steel of the saw teeth, to the outer end portion of each tooth to be provided with a hard cutting point; severing the rod close to the tooth; and shaping the welded-on piece of hard metal into a cutting point for the tooth.

4. A method of providing hard cutting points for the teeth of a saw formed of steel possessing the properties necessary to withstand shock and have good resistance to fatigue failure, which comprises: electric-welding an end of a carbide rod to the outer end portion of each tooth to be provided with a hard cutting point; severing the rod close to the tooth; and shaping the welded-on piece of carbide into a cutting point for the tooth.

5. A method of providing a hard cutting point for a tooth of a saw formed of steel possessing the properties necessary to withstand shock and have good resistance to fatigue failure which comprises: electric-welding an end of a carbide rod to the front edge of the tooth at the outer end portion thereof; severing the rod close to the tooth; and shaping the welded-on piece of carbide into a cutting point for the tooth.

6. A method of providing a hard cutting point for a tool formed of steel possessing the properties necessary to withstand shock and have good resistance to fatigue failure which comprises: simultaneously electric-welding an end of a carbide rod to the tool and forcing the end portion of the rod into the tool by passing a welding current across the junction between the carbide rod and the steel tool and pushing the rod endwise towards the tool when the contiguous portion of the steel tool attains substantially the temperature at which it becomes plastic; severing the rod close to the tool; and shaping the welded-on piece of carbide into a cutting point for the tool.

7. A method of providing a steel saw tooth with a carbide cutting tip wherein the carbide cutting tip is electric-welded to the steel of the tooth, said method comprising: engaging an end of a carbide rod against the outer portion of the front edge of the tooth; connecting the steel tooth and the carbide rod in an electric-welding circuit to thereby pass electric-welding current across the junction between the carbide and the steel whereupon the contiguous portion of the steel is brought to substantially the temperature at which it is plastic; forcing the carbide rod endwise toward the tooth to thereby push the end of the rod into the tooth; terminating the flow of welding current; severing the rod close to the weld but outwardly of the front edge of the tooth; and shaping the remaining welded-on piece of carbide as needed to form the same into a cutting tip for the saw tooth.

8. A method of forming carbide cutting tips on the teeth of a steel metal cutting saw blade which comprises: gripping the steel saw blade in a fixture which is connected to one side of a source of electric-welding current; gripping a carbide rod in another fixture which is connected with the other side of the source of electric-welding current; effecting relative motion between said fixtures to engage an end of the carbide rod with the front edge of a saw tooth at the outer end thereof, so that the rod projects endwise from said front edge of the tooth, and with the passage of current across the junction the contiguous portion of the steel attains substantially the temperature at which it becomes plastic; effecting relative motion between the fixtures to force the end of the carbide rod into the steel tooth whereupon the rod penetrates into the tooth and becomes welded thereto; terminating the flow of electric-welding current; severing the carbide rod close to the weld but forwardly of the front edge of the tooth whereupon a small piece of carbide remains welded to the outer end portion of the front edge of the tooth; moving the fixture which grips the carbide rod to withdraw the rod a short distance from the tooth to allow the saw band to be advanced; advancing the band to bring the next tooth to be provided with a carbide tip into position in front of the end of the carbide rod; repeating the aforesaid sequence of steps for each tooth to be provided with a carbide tip; and shaping the welded-on pieces of carbide as needed to form the same into cutting tips.

9. A method of making a toothed metal cutting saw blade having extremely hard points on all or on certain of its teeth, and suitable for use in band-sawing machines, which comprises: forming teeth along an edge of a strip of steel possessing the properties necessary to withstand shock and have good resistance to fatigue failure; electric-welding an end of a rod of very hard metal to the outer end portion of each tooth which is to have a hard point; severing the rod closely adjacent to the weld to leave a small piece of the very hard metal on the tooth; and shaping the piece of very hard metal into a cutting point for the tooth.

10. A method of making a toothed metal cutting saw blade having extremely hard points on all or on certain of its teeth, and suitable for use in band sawing machines, which comprises: forming teeth along an edge of a strip of steel possessing the properties necessary to withstand shock and have good resistance to fatigue failure; electric-welding an end of a carbide rod to the front edge of each tooth which is to have a hard point, and at the same time pushing the end of the carbide rod beyond the front edge of the tooth and into the outer end portion of the tooth; severing the carbide rod a short distance ahead of the front edge of the tooth to thus leave a piece of carbide on the tooth, so positioned thereon that a plane containing the front edge of the tooth passes through the piece; and shaping the carbide piece into a cutting point for the tooth.

11. The method of claim 10, further characterized by the fact that the distance between the front edge of the tooth and where the carbide rod is severed, and the shaping of the piece of carbide left on the tooth is such that the depth of the piece as measured from the front face thereof back to its welded junction with the steel of the tooth does not exceed about fifteen thousandths of an inch.

12. A method of making a toothed metal cutting saw blade having extremely hard points on all or certain of its teeth, which comprises: forming teeth along an edge of a strip of steel possessing the properties necessary to withstand shock and have good resistance to fatigue failure; electric welding an end of a carbide rod to the front edge of the outer end portion of each tooth which is to have a hard point, by bringing the end of the rod against the front edge of the tooth, passing an electric welding current across the junction between the carbide rod and the steel tooth to thereby bring the contiguous portion of the steel to substantially the temperature at which it is plastic, forcing the rod endwise towards the tooth to upset the contiguous portion of the tooth and force the end of the rod into the tooth; interrupting the flow of welding current; severing the rod closely adjacent to but spaced from the front edge of the tooth to thus provide the tooth with a welded-on carbide tip portion; and dressing the welded-on carbide tip portion as needed to form the same into a cutting tip.

13. The hereindescribed method of making a toothed metal cutting saw band having extremely hard tipped teeth which comprises: forming teeth on an edge of a band of spring tempered steel; intermittently advancing the toothed band through a tip applying station; at said tip applying station welding a tiny piece of carbide to the outer front portion of each saw tooth as said tooth is at rest at the tip applying station, by bringing the end of a carbide rod against the front edge of the tooth at the outer portion thereof while the band and the rod are respectively connected to the opposite terminals of a source of electric welding current so that the current flowing across the junction between the rod and the tooth heats the contiguous portion of the steel tooth to substantially its plastic deformation temperature, forcing the rod endwise towards the tooth to effect a slight upsetting of the contiguous tip portion of the steel and to project the end of the rod into the tooth; at this point terminating the flow of welding current; and severing the carbide rod just ahead of the front edge of the tooth.

14. The method of claim 13, wherein the carbide rod has a rectangular cross section, the dimension between two opposite sides of which is equal to the thickness of the band; and wherein said opposite sides of the rod are coplanar with the opposite faces of the band as the rod is brought into engagement with the tooth, and during the welding thereof to the tooth.

15. The method of claim 14, wherein the carbide rod is severed on a plane parallel to the front edge of the tooth.

16. The method of claim 15, wherein the severance of the rod is effected by a very thin diamond-edge cutoff wheel.

17. A method of providing a hard cutting edge for a tool formed of steel possessing the properties necessary to withstand shock, which comprises: bringing a piece of tungsten carbide into contact with the steel tool at the zone thereof where the cutting edge is to be located; passing a welding current across the junction of the tungsten carbide and the steel to thereby heat a contiguous portion of the steel to its fusion temperature; at the instant said fusion temperature is reached, pressing the piece of tungsten carbide against the steel tool to thereby force the former into the latter and weld the two together; annealing the portion of the steel tool contiguous to the welded junction; and dressing the welded-on piece of tungsten carbide as needed to form the cutting edge.

18. A method of providing a hard cutting point for the tooth of a saw formed of steel possessing the properties necessary to withstand shock and have good resistance to fatigue failure, which method comprises: holding an end of a tungsten carbide rod against the outer end portion of the tooth; passing an electric welding current across the junction of the rod and tooth to thereby quickly bring the contiguous portion of the steel tooth to its fusion temperature and the adjacent portion thereof to its plastic deformation temperature; at the instant said temperatures are reached, pushing the tungsten carbide rod firmly against the steel tooth to force the rod into the tooth and bring the end of the rod against the portion of the tooth which is at its plastic deformation temperature whereupon the rod becomes welded to the tooth; annealing the portion of the tooth adjacent to the welded junction; severing the rod close to the welded junction; and dressing the piece of tungsten carbide thus left on the tooth as needed to provide a sharp cutting point for the tooth.

19. The method of claim 18, wherein the annealing step is performed directly after the welding of the rod to the tooth, and by appropriate adjustment of the welding current.

References Cited in the file of this patent
UNITED STATES PATENTS

| | | |
|---|---|---|
| 1,424,536 | Wenger | Aug. 1, 1922 |
| 1,535,096 | Blum | Apr. 28, 1925 |
| 1,635,217 | Kirchman | July 12, 1927 |
| 1,919,358 | Bem | July 25, 1933 |
| 2,003,019 | Strobel | May 28, 1935 |
| 2,779,858 | Pityo | Jan. 29, 1957 |
| 2,867,137 | Joy | Jan. 6, 1959 |

FOREIGN PATENTS

| | | |
|---|---|---|
| 1,233,309 | France | May 2, 1960 |